(12) United States Patent
Cuevas

(10) Patent No.: US 7,477,139 B1
(45) Date of Patent: Jan. 13, 2009

(54) APPARATUS AND METHOD FOR SECURING A MOTOR VEHICLE SEAT BELT

(76) Inventor: Armando Cuevas, 484 Cappella Dr., Diamond Springs, CA (US) 95619

(*) Notice: Subject to any disclaimer, the term of this patent is extended or adjusted under 35 U.S.C. 154(b) by 185 days.

(21) Appl. No.: 11/258,652

(22) Filed: Oct. 25, 2005

(51) Int. Cl.
*B60Q 1/00* (2006.01)

(52) U.S. Cl. .............................. 340/457.1; 340/426.24; 340/426.25

(58) Field of Classification Search .............. 340/457.1, 340/426.24, 426.25, 426.5
See application file for complete search history.

(56) References Cited

U.S. PATENT DOCUMENTS 4,552,407 A * 11/1985 Takada ........................ 297/476
4,796,919 A * 1/1989 Linden ........................ 280/808
4,893,835 A * 1/1990 Linden ........................ 280/808
6,312,015 B1 * 11/2001 Merrick et al. .............. 280/804
6,631,926 B2 * 10/2003 Merrick et al. .............. 280/804

* cited by examiner

*Primary Examiner*—Daryl C Pope
(74) *Attorney, Agent, or Firm*—Richard S. Erbe

(57) ABSTRACT

An apparatus for securing a motor vehicle seat belt includes a housing, a control module, a jaw and a clamp. The jaw and the clamp are connected by a hinge. Gripping elements on the bottom of the housing and the top of the clamp allow the securing device to be attached to the seat belt when it is in extended position, providing extra slack in the belt to allow a person to secure an individual sitting in an auxiliary seat to be secured to a motor vehicle seat by means of the motor vehicle seat belt system. Audible and visible indicators are incorporated to let the person know that the apparatus is still in place and should be removed after the auxiliary seat has been attached to the seat belt, thereby securing the individual in the auxiliary seat.

16 Claims, 6 Drawing Sheets

APPARATUS AND METHOD FOR SECURING A MOTOR VEHICLE SEAT BELT

RELATED APPLICATIONS

Not applicable

BACKGROUND OF THE INVENTION

1. Field of the Invention

The present invention relates to devices associated with seat belts, and more particularly, to an apparatus and method for securing a motor vehicle seat belt in an extended configuration to assist a person in securing a child seat or similar device in an automobile seat.

2. General Background and State of the Art

Automobile seat belts have been a mandatory item in automobiles for several decades, and statistical studies show that their proper use saves lives and prevents injuries that may have been otherwise incurred because of a sudden stop or a collision.

Also mandatory in almost all of the United States is the use of a "baby seat" or booster seat in automobiles for very young passengers. In the State of California, for example, the law requires an infant up to a certain age and size to be placed in a baby seat behind the front seat when riding in a motor vehicle. At a certain point, a child is still required to ride in a "booster seat" up until the age of six years or until the child reaches sixty pounds in weight. As with the baby seat, it is required that the booster seat be secured behind the front seat, so that up to a certain age and/or size, a child is not lawfully allowed to ride in the front seat of a motor vehicle. There are also specially designed seats for securing handicapped or special needs individuals safely in motor vehicles.

These kinds of seats, which will be referred to hereafter as "auxiliary seats" are designed to be used with the motor vehicle's already installed seat belts.

Most motor vehicle seat belts in modern day automobiles use a version of what is known as an "inertia reel" to allow for the seat belt to be extended or retracted by the application or release of an evenly-applied tension force. This allows a rider in a motor vehicle to readily pull out the seat belt from the motor vehicle frame and secure the tongue at the end of the seat belt into a latch attached to the seat. When the tongue is securely locked in place, a person simply releases tension from the seat belt, and the inertia reel takes up any slack into the vehicle frame. Any sudden pressure applied to the seat will not allow the belt to move, because the inertia reel will prevent the belt from extending any further from the vehicle frame due to a sudden force on the belt, such as might be experienced in a sudden stop.

A problem associated with seat belts in today's motor vehicles is that when a person is trying to secure a child or person in an auxiliary seat in the automobile by means of a seat belt, the person needs to pull out, and temporarily have available, an excess length of seat belt while trying to keep the child or person still or in a certain position. The problem is, the seat belt system, because of how it is designed to take up slack in the belt, will be trying to pull in the slack while the person is both trying to secure the seat belt and position the person correctly and comfortably in the auxiliary seat. Trying to perform this operation with only two hands can be cumbersome and frustrating.

A person could try to resolve the problem by pulling out an excess length of seat belt from the motor vehicle frame and to secure it by using their body weight or a heavy object. Using the body weight can make the already cumbersome operation even more cumbersome, while using a weighted object carries with it the problem of remembering to remove the weight from the seat belt so that the motor vehicle seat belt system can pull up the slack in the belt and provide a secure seating arrangement for the child or person in the auxiliary seat. If the person forgets to remove the weighted object, the seat belt has slack and in the event of a sudden stop of the motor vehicle, the person in the auxiliary seat is exposed to danger because they are not properly secured to the automobile.

There exists, therefore, a need for a device and method for temporarily securing a motor vehicle seat belt in its extended position that does not require the use of excess weight.

There also exists a need for a device and method for temporarily securing a motor vehicle seat belt in its extended position that requires a minimum of manipulation.

There further exists a need for a device and method for temporarily securing a motor vehicle seat belt in its extended position that can be used with motor vehicles of all known makes and models.

There further exists a need for a device and method for temporarily securing a motor vehicle seat belt in its extended position that also includes a means to remind the person using the seat belt that the device must be removed from the seat belt, once the child or person has been safely secured in his or her auxiliary seat with the motor vehicle seat belt.

No known device overcomes these problems and provides the advantages of the invention described herein.

SUMMARY OF THE INVENTION

Accordingly, it is an object of the invention to provide a device that is easy to use and can readily secure a motor vehicle seat belt in an extended position.

An additional object of the invention is to provide a device and method for temporarily secure a motor vehicle seat belt in an extended position that provides features to remind the user to discontinue use of the device once a child or other person has been secured in their auxiliary seat in the motor vehicle.

These and other objectives are achieved by the present invention, which, in a broad aspect, provides the user with an apparatus that can be easily attached to a motor vehicle seat belt and secure it in an extended position for a desired period of time. The apparatus according to the present invention also contains provisions to ensure that a user is reminded that it must be removed from the seat belt after a period of time to make sure that no slack remains in the belt and that a person secured in an auxiliary seat to the motor vehicle seat will not be exposed to harm caused by a sudden stop.

An apparatus according to the preferred embodiment of the present invention provides a securing apparatus for use with a motor vehicle seat belt that includes a housing in which is placed a control module having a programmable chip to provide an audible alert to the user that the securing device should be removed from the seat belt after a certain elapsed time.

The housing slides into and is secured inside a clamp and is hingedly mounted to a jaw member. The top surface of the clamp and the bottom surface of the housing include gripping elements to hold the securing apparatus to the seat belt.

To mount the securing apparatus to the seat belt, the user first extends the seat belt so that they have the desired length they wish to use to secure a person in an auxiliary seat to the motor vehicle seat. The clamp and jaw are fitted over the seat belt at the desired point and closed. A tongue on the clamp fits over serrations in the end of the jaw. Gripping elements on the housing bottom and top of the jaw grip the seat belt to hold the securing apparatus to the seat belt. When the securing apparatus abuts the frame of the motor vehicle where the seat belt enters the motor vehicle frame, the securing apparatus will prevent any more of the seat belt from being retracted into the motor vehicle frame.

Once the apparatus is installed on the seat belt, the user can then take their time and use both hands to settle the person or child in the auxiliary seat and secure the auxiliary seat with the seat belt. At the same time, a proximity switch on the securing apparatus senses that the jaw is closed and starts a timer in the control module. After a programmed amount of time, the timer initiates an audible sound through a speaker in the control module and causes a lighting device, preferably a light emitting diode (LED) to blink to alert the user that the securing device is still secured to the seat belt and that the seat belt is not constraining the auxiliary seat.

If the user does not remove the securing apparatus from the seat belt after another programmed interval of time, the audible alarm will make a louder sound to alert the user. After another programmed period of time, if the securing device is still in place, the sound will become even louder. The audible sound is programmed to get progressively louder until the securing apparatus has been removed from the seat belt.

To release the securing apparatus, the clamp is pushed forward until the tongue no longer engages the serrations in the jaw. The clamp can then be rotated away from the jaw, opening the securing apparatus and allowing it to be removed from the seat belt.

After the jaw and clamp have been opened, the proximity switch opens and resets the timer and stops the audible sound and the blinking of the LED.

A low voltage sensor in the programmable chip in the control module senses if the apparatus's power source, which is preferably a battery, is low and illuminates the LED so that it glows steadily (rather than blinking), which can only be reset when the battery is replaced.

Further objects and advantages of this invention will become more apparent from the following description of the preferred embodiments, which, taken in conjunction with the accompanying drawings, will illustrate, by way of example, the principles of the invention.

BRIEF DESCRIPTION OF THE DRAWINGS

The foregoing and other objects, aspects and advantages will be better understood from the following detailed description of the preferred embodiment of the invention with reference to the drawings, in which.

DETAILED DESCRIPTION OF THE PREFERRED EMBODIMENT OF THE INVENTION

Figure 1:
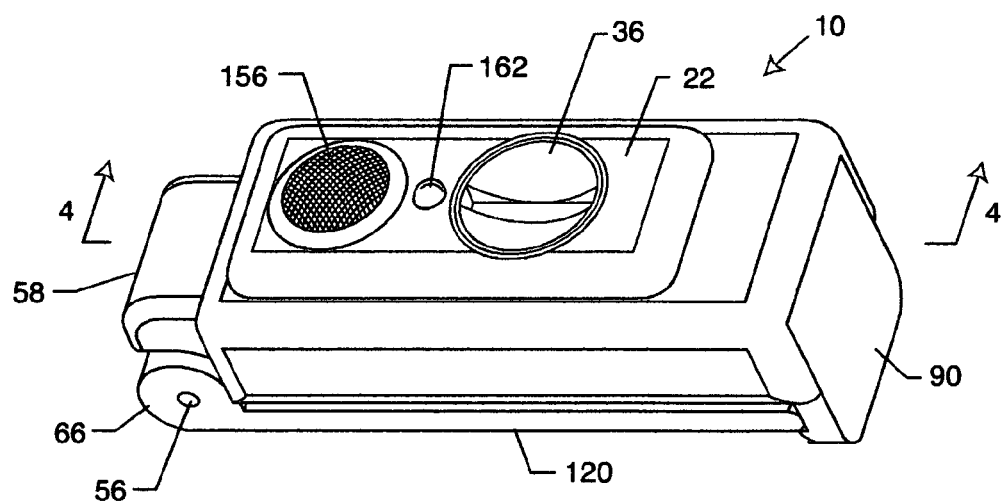
FIG. 1 illustrates a perspective view of an exemplary apparatus according to the present invention, with the apparatus in the closed position.
Figure 3:
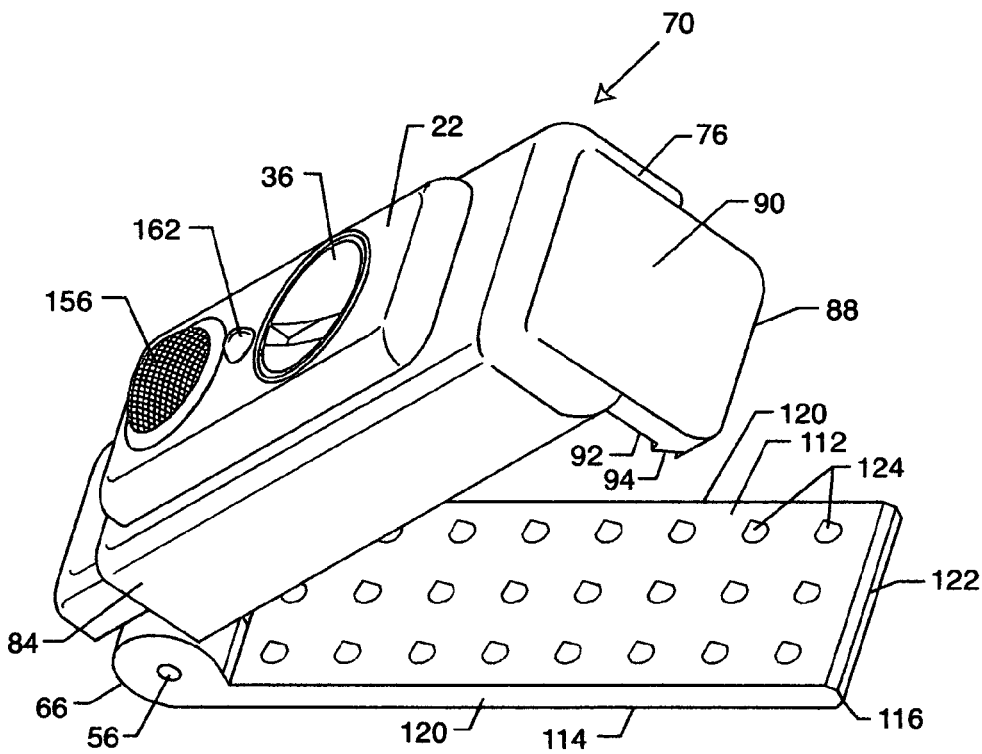
FIG. 3 illustrates a perspective view of an exemplary apparatus according to the present invention, with the apparatus in the open position.

In the following description of the present invention, reference is made to the accompanying drawings, which form a part thereof, and in which are shown, by way of illustration, an exemplary embodiment illustrating the principles of the present invention and how it may be practiced. It is to be understood that other embodiments may be utilized to practice the present invention and structural and functional changes may be made thereto without departing from the scope of the present invention.

An apparatus in accordance with the present invention is illustrated in FIGS. 1-6 and generally referred to by the reference numeral 10. There are four major components of apparatus 10 (best illustrated in FIG. 2): control module 20, housing 40, clamp 70, and jaw 110. These components are preferably constructed primarily of a durable plastic material.

Housing 40, in the preferred embodiment of the invention, is generally rectangular in shape. It is formed by top surface 42, bottom surface 44, a pair of slotted side walls 48, first end wall 52 and second end wall 54. Slots 50 in each of the slotted side walls 48 are designed to enable a secure fit between housing 40 and clamp 70 in conjunction with raised elements 86 in clamp 70, as will be discussed below. A receptacle 46 is formed in housing 40 and can accommodate control module 20 if desired.

At second end wall 54 is formed a hinge extension 58 and inner hinge portion 60 to allow for the formation of hinge 66 when inner hinge portion 60 is connected to outer hinge portion 126 in jaw 110 by means of a hinge pin 56 extending through openings 128 in outer hinge portion 126 and opening 62 in inner hinge portion 60.

Figure 4:
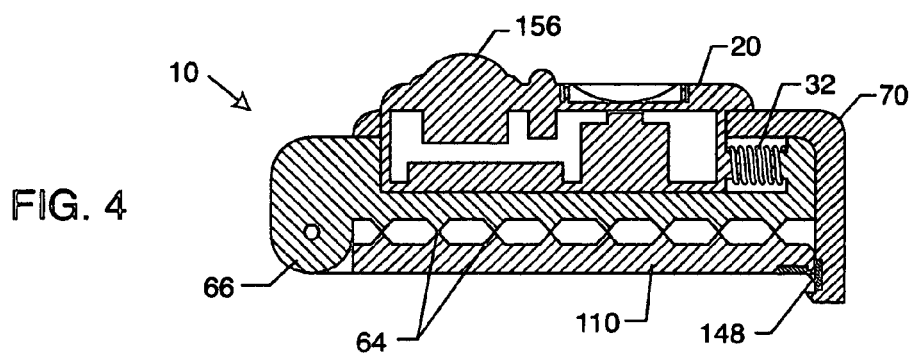
FIG. 4 illustrates a sectional view taken at line 4-4 in FIG. 1.
Figure 6:
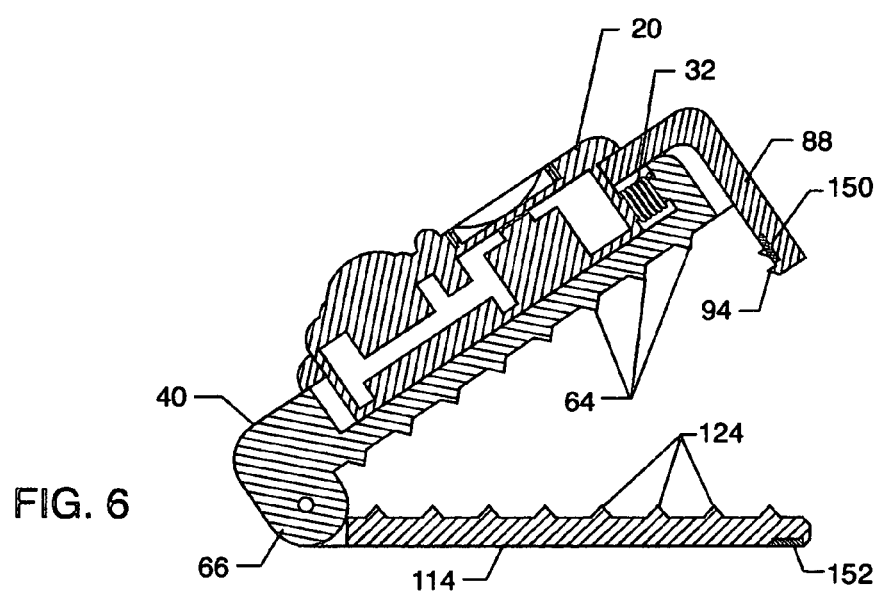
FIG. 6 illustrates a sectional side view of an exemplary apparatus according to the present invention, with the apparatus in the open position.

On bottom surface 44 of housing 40 is a plurality of gripping elements 64, as best shown in FIGS. 4 and 6 to enable apparatus 10 to firmly grip a motor vehicle seat belt.

Housing 40 is designed to fit within clamp 70 by sliding it into aperture 98, of clamp 70. Clamp 70 is formed by upper surface 72, front wall 76, rear wall 78, and a pair of side walls 80. Clamp 70 is open at the bottom. Each side wall 80 has an inner surface 82 and an outer surface 84. An opening 96 is formed in the upper surface 72.

Along a portion of the inner surface 82 of each side wall 80 is a raised element 86, which is designed to fit into slots 50 on slotted side walls 48 when housing 40 is inserted into aperture 98.

Front wall 76 also includes a tongue 88, which has a first side 90 and a second side 92. Second side 92 includes a number of serrations to enable the clamp 70 to secure clamp 70 and jaw 110, as will be discussed below.

Jaw 110 is formed by top 112, bottom 114, forward end 116, rearward end 118 and a pair of sides 120. At forward end 116 is shaped surface 122, which is configured to join with serrations 94 so that jaw 110 and clamp 70 can form a secure fit when so desired to grip a motor vehicle seat belt. Gripping elements 124 arrayed along top 112 help to provide a firm grip on the motor vehicle seat belt in conjunction with gripping elements 64 on housing 40 when jaw 110 and clamp 70 are closed around the seat belt.

At rearward end 118 of jaw 110 is outer hinge portion 126 which, in conjunction with inner hinge portion 60 on housing 40 and hinge pin 56 to form hinge 66, thus allowing the jaw 110 and clamp 70 to form a hinged connection to each other. Hinge pin 56 secures outer hinge portion 126 to inner hinge portion 60 through openings 62 and 128.

The assembly of housing 40, clamp 70 and jaw 110 would allow a person to secure a motor vehicle seat belt in an extended position, as will be discussed later. However, the inventor recognizes that the use of the apparatus according to the present invention could present a safety issue if the vehicle seat belt is left in an extended position while the vehicle is in motion and the seat belt may not actually be securing the person it was intended to be securing because there is still slack in the belt. To address this issue, a control module 20 is provided that fits into receptacle 46 of housing 40 and may be accessed through top opening 96 in clamp 70 when the four major components are assembled together.

Figure 2:
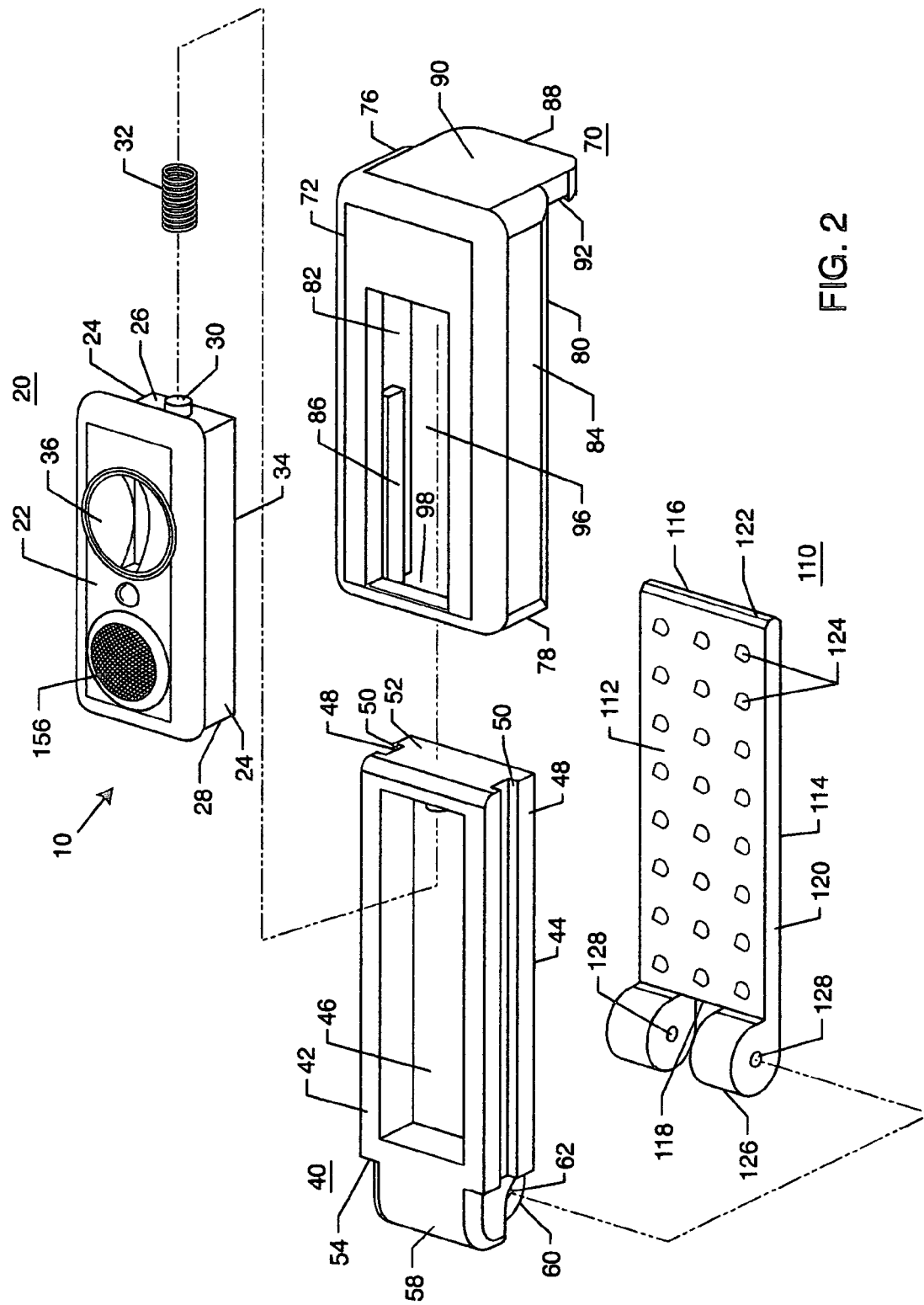
FIG. 2 illustrates an exploded view of an exemplary apparatus according to the present invention.

Control module 20 is formed by top surface 22, bottom 34, front wall 26, back wall 28, and a pair of side walls 24. Front wall 26 includes a projection 30, which abuts a spring 32 that is positioned between projection 30 and first end wall 52 of housing 40. A battery cover 36, lighting device 162 and speaker 156 are shown in FIGS. 1 and 2 in top surface 22 of control module 20.

To assemble the components of apparatus 10, control module 20 is inserted in receptacle 46 of housing 40; the combined control module 20 and housing 40 slide into clamp 70 through aperture 98. These three assembled parts, control module 20, housing 40 and clamp 70 are connected by hinge 66 by inserting hinge pin 56 through outer hinge portion 126 and inner hinge portion 60.

While apparatus 10 may be operated without control module 20, control module 20 provides safety features that will help prevent a situation where the motor vehicle is operated while the belt is extended. FIGS. 8 through 11 show how apparatus 10 may be attached to seat belt 176 when it is in extended position. While it is convenient to have seat belt 176 extended to secure an individual in an auxiliary seat in the automobile, it could pose a risk to that person if the apparatus 10 remains attached to the belt while the motor vehicle is in motion and the seat belt is not actually securing the person in the auxiliary seat.

Figure 7:
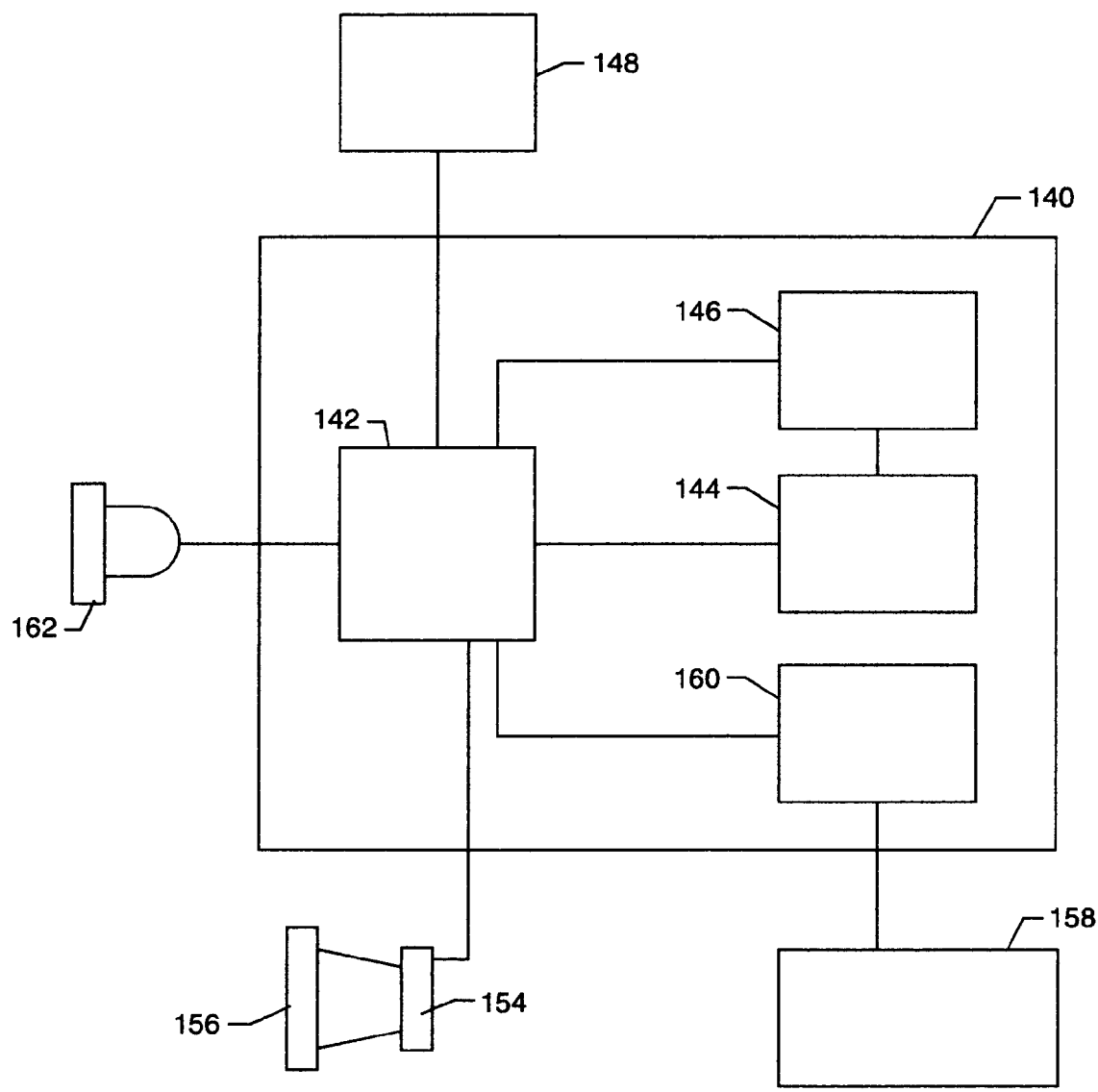
FIG. 7 illustrates a schematic diagram of the control system for use with an exemplary apparatus according to the present invention.

FIG. 7 illustrates the control components that make up the safety system contained in the control module 20. Programmable integrated circuit chip 140 includes central processing unit 142, memory 144, and timer 160 in communication with proximity switch 148. Proximity switch 148 includes proximity switch sensor 150, located on one surface of tongue 88 on clamp 70 and proximity switch magnet 152 on jaw 110.

When apparatus 10 has been attached to the seat belt, proximity switch 148 senses that the jaw 110 and clamp 70 are closed and initiates timer 146. Gripping elements 64 and 124 provide a secure grip on the seat belt. After a certain programmed time has lapsed, timer 146 causes an audible sound to be produced by means of amplifier 154 and speaker 156. At the same time, lighting device 162 is caused to start blinking. The audible and visual signals thus provided alert the persons in the motor vehicle that apparatus 10 is still secured to the seat belt and the seat belt is in an extended position. If apparatus 10 is not removed from the seat belt after another programmed interval of time, the audible sound is made louder. Timer 146 may be programmed to provide increasingly loud signals over programmed intervals of time until proximity switch 148 senses that apparatus 10 has been removed from the seat belt. When jaw 110 and clamp 70 are opened, proximity switch 148 senses that apparatus 10 is no longer attached to the seat belt and resets timer 146. Lighting device 162, which in the preferred embodiment of the invention is a light emitting diode, is then dimmed and the audible sound emitted by speaker 156 stops.

Power to the control module 20 is provided by battery 158, which may be accessed by removing battery cover 36. A low voltage circuit 160 senses when battery 158 is low in power and causes lighting device 162 to illuminate to alert the user to replace the battery.

Figure 8:
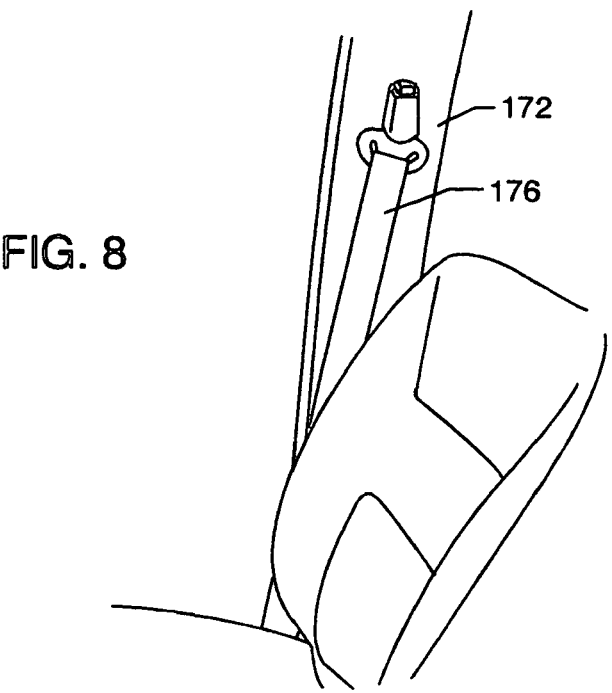
FIG. 8 illustrates a perspective view of a portion of the interior of a motor vehicle showing the seat belt fully retracted.

Proper use of an apparatus according to the present invention is illustrated in FIGS. 8-11. FIG. 8 shows a partial view of the interior of a motor vehicle 172 with a seat belt 176 emerging from the vehicle frame. Latch 180 is used to lock seat belt 176.

Figure 9:
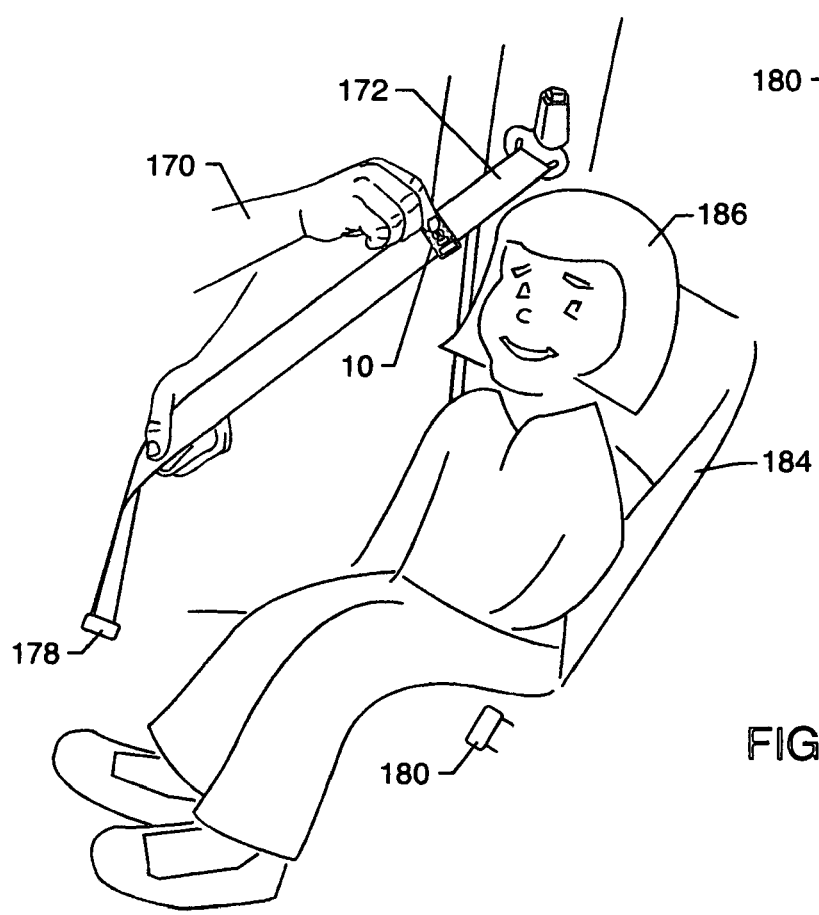
FIG. 9 illustrates a perspective view of a person applying the exemplary apparatus according to the present invention to an extended seat belt, while a child sits in an auxiliary seat.
Figures 10, 11:
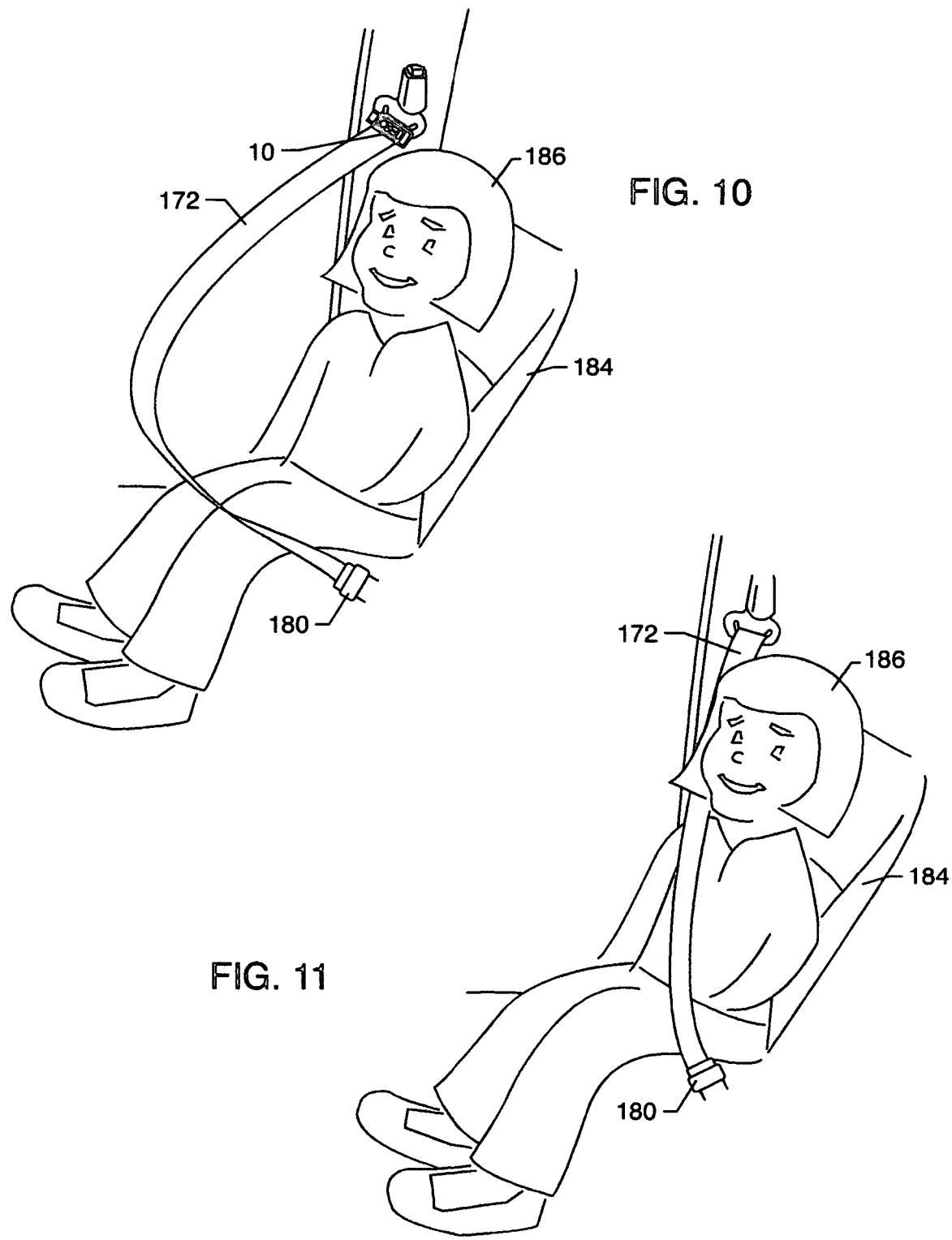
FIG. 10 illustrates a perspective view of an exemplary apparatus according to the present invention securing the seat belt in an extended position, with the seat belt now latched.
FIG. 11 illustrates a perspective view of a child safely secured in an auxiliary seat in a motor vehicle after the exemplary apparatus according to the present invention has been removed from the seat belt.

FIGS. 9-11 illustrate how to use apparatus 10 to secure a child 186 to an auxiliary seat 184 inside a motor vehicle. In FIG. 9, the user 170 pulls out seat belt 172 and tongue 178 and attaches apparatus 10 around seat belt 172.

In FIG. 10, tongue 178 has been inserted in latch 180, while apparatus 10 now holds seat belt 172 in an extended position.

Figure 5:
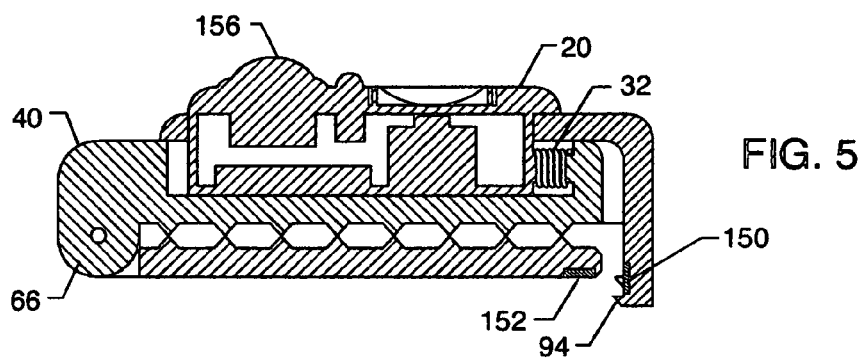
FIG. 5 illustrates a sectional side view of an exemplary apparatus according to the present invention.

In FIG. 11, apparatus 10 has been removed from seat belt 172 and any extra length of the seat belt has retracted within the frame of the motor vehicle, securing child 186 in auxiliary seat 184. As best illustrated in FIG. 5, release of apparatus 10 is accomplished by sliding clamp 70 forward against spring 32, allowing jaw 110 to release from the serrations 94 on clamp 70.

The foregoing description of an exemplary embodiment of the present invention has been presented for purposes of enablement, illustration, and description. It is not intended to be exhaustive of or to limit the present invention to the precise form discussed. There are, however, other configurations for seat belt securing apparatuses not specifically described herein, but with which the present invention is applicable. The present invention should therefore not be seen as limited to the particular embodiment described herein.

What is claimed is:

1. A securing apparatus for attaching to a seat belt in a motor vehicle, said apparatus comprising:

a housing having a top and a bottom surface, a receptacle formed by front and back walls and a pair of side walls extending therebetween, each of said side walls having a slot formed in it, a hinge extension connected to the back wall, said hinge extension having an inner hinge portion and a plurality of gripping teeth extending from said bottom surface;

a clamp formed by a front wall and a rear wall and a pair of side walls extending therebetween, said side walls each having a raised element to engage the slots in the side walls of the housing, said rear wall having a shaped opening into which is inserted the housing, a tongue having a first side and a second side attached to and extending from said front wall, said tongue further having serrations on said second side;

a jaw having a top and a bottom, a forward end and a rearward end and a pair of side walls extending therebetween, an outer hinge portion extending from said back end to rotatable engage the inner hinge portion of said housing, said forward end shaped to engage the serrations in the clamp, and a plurality of gripping teeth extending from said top;

a hinge pin connecting said outer hinge portion and said inner hinge portion and a control module mounted in the receptacle, said control module having a top surface and a bottom surface, a pair of end walls and a pair of side walls extending therebetween.

2. The apparatus according to claim 1, further having a control system to detect attachment of said apparatus to said seat belt, said control system comprising:
- a programmable integrated chip mounted in said control module, said chip including:
  - a timer;
  - a central processing unit; and
  - a memory;
- a power source;
- a proximity switch sensor mounted on said second side of said tongue; and
- a proximity switch magnet mounted on said forward end of said jaw,
- whereby, when the serrations on the clamp are in contact with the forward end of the jaw, indicating that the apparatus has engaged the seat belt, a signal is sent to initialize said timer.

3. The apparatus according to claim 2, further comprising:
- an amplifier mounted in the control module in communication with said timer;
- a speaker mounted in the control module in communication with said amplifier; and
- a lighting device mounted in said control module in communication with said timer.

4. The apparatus according to claim 3, wherein said lighting device is a light emitting diode.

5. The apparatus according to claim 3, wherein said timer will cause said speaker to emit an audible sound and cause said lighting device to blink after a preprogrammed time has elapsed.

6. The apparatus according to claim 5, wherein said timer will cause said audible sound to progressively increase in volume as more preprogrammed time intervals elapse.

7. The apparatus according to claim 2, wherein said power source is a battery.

8. The apparatus according to claim 3, further comprising a low voltage circuit connected to the power source,
whereby, when the low voltage circuit detects low voltage in the power source, the low voltage circuit will cause the lighting device to illuminate continuously.

9. A method of assisting the act of securing a person sitting in an auxiliary seat into the seat of a motor vehicle with the motor vehicle's seat belt, the method comprising the steps of:
- placing the auxiliary seat onto the seat of the motor vehicle;
- positioning the person in the auxiliary seat;
- pulling a desired length of seat belt from the frame of the motor vehicle;
- attaching a hinged securing device having a housing, a control module in the housing, a jaw and a clamp to the seat belt adjacent the place where the seat belt projects from the frame of the motor vehicle, thereby preventing the seat belt from retracting;
- inserting the tongue of the seat belt into the latch on the auxiliary seat;
- removing the hinged securing device from the seat belt, while the person remains in the auxiliary seat;
- allowing any extra length of the seat belt to retract into the frame of the motor vehicle and
- attaching a proximity sensor on the securing device to detect when the jaw and the clamp are closed around the seat belt;
- providing a programmable integrated circuit chip having a timer in the control module in communication with said proximity sensor, said timer initiated by said proximity switch when said jaw and clamp are closed around the seat belt; and
- incorporating an amplifier and a speaker in said control module in communication with said timer,
- whereby, when the timer has counted down a preprogrammed timer after being initiated by said proximity switch, a signal is generated activating the amplifier and speaker to generate an audible sound.

10. The method according to claim 9, further comprising the step of providing an illumination device in the control module in communication with said proximity sensor,
whereby, when said audible sound is generated, the lighting device begins to blink on and off continuously.

11. A securing apparatus for attaching to a seat belt in a motor vehicle, said apparatus comprising:
- a clamp having a front wall and a rear wall, a pair of side walls extending therebetween, a top surface and a bottom surface, a hinge extension having an inner hinge portion, a plurality of gripping teeth extending from said bottom surface, said front wall having serrations on its surface;
- a jaw having a top and a bottom, a forward end and a rearward end and a pair of side walls extending therebetween, an outer hinge portion extending from said back end to rotatably engage the inner hinge portion of said clamp, said forward end shaped to engage the serrations in the clamp, and a plurality of gripping teeth extending from said top;
- a hinge pin connecting the inner hinge portion and the outer hinge portion; and
- a control module mounted in the clamp, said control module having a top surface and a bottom surface, a pair of end walls and a pair of side walls extending therebetween.

12. The apparatus according to claim 11, further having a control system to detect attachment of said apparatus to said seat belt, said control system comprising:
- a programmable integrated chip mounted in said control module, said chip including:
  - a timer;
  - a central processing unit; and
  - a memory;
- a power source;
- a proximity switch sensor mounted on the front wall of the clamp; and
- a proximity switch magnet mounted on said forward end of said jaw,
- whereby, when the serrations on the clamp are in contact with the forward end of the jaw, indicating that the apparatus has engaged the seat belt, a signal is sent to initialize said timer.

13. The apparatus according to claim 12, further comprising:
- an amplifier mounted in the control module in communication with said timer;
- a speaker mounted in the control module in communication with said amplifier; and
- a lighting device mounted in said control module in communication with said timer.

14. The apparatus according to claim 13, wherein said lighting device is a light emitting diode.

15. The apparatus according to claim 13, wherein said timer will cause said speaker to emit an audible sound and cause said lighting device to blink after a preprogrammed time has elapsed.

16. The apparatus according to claim 15, wherein said timer will cause said audible sound to progressively increase in volume as more preprogrammed time intervals elapse.

* * * * *

UNITED STATES PATENT AND TRADEMARK OFFICE
CERTIFICATE OF CORRECTION

| | |
|---|---|
| PATENT NO. | : 7,477,139 B1 |
| APPLICATION NO. | : 11/258652 |
| DATED | : January 13, 2009 |
| INVENTOR(S) | : Armando Cuevas |

It is certified that error appears in the above-identified patent and that said Letters Patent is hereby corrected as shown below:

On the Title Page Item (76), inventor's address is shown as "484 Cappella Drive, Diamond Springs, CA 95619." Inventor's address should read "464 Cappella Drive, Diamond Springs, CA 95619."

Signed and Sealed this

Twenty-fourth Day of February, 2009

JOHN DOLL
*Acting Director of the United States Patent and Trademark Office*